United States Patent
Biger-Levin et al.

(10) Patent No.: US 8,965,340 B1
(45) Date of Patent: Feb. 24, 2015

(54) MOBILE DEVICE INDENTIFICATION BY DEVICE ELEMENT COLLECTION

(71) Applicant: EMC Corporation, Hopkinton, MA (US)

(72) Inventors: Ayelet Biger-Levin, Newton, MA (US); Orit Yaron, Herzeliya (IL); Triinu Magi-Shaashua, Herzeliya (IL); Asaf Shoval, Rishon-LeZion (IL)

(73) Assignee: EMC Corporation, Hopkinton, MA (US)

( * ) Notice: Subject to any disclaimer, the term of this patent is extended or adjusted under 35 U.S.C. 154(b) by 205 days.

(21) Appl. No.: 13/628,441

(22) Filed: Sep. 27, 2012

(51) Int. Cl.
*H04M 1/66* (2006.01)
*H04W 12/06* (2009.01)
*H04L 29/06* (2006.01)
*G06F 21/31* (2013.01)

(52) U.S. Cl.
CPC .......... *H04W 12/06* (2013.01); *H04L 63/0876* (2013.01); *G06F 21/316* (2013.01)
USPC ......................................................... 455/411

(58) Field of Classification Search
CPC ..... H04W 12/00; H04W 12/06; H04W 12/10; H04W 12/12; H04M 1/72577; G06F 21/00; G06F 21/316; H04L 9/00; H04L 63/00; H04L 63/0876

USPC .................................. 455/410–411, 418–420
See application file for complete search history.

(56) References Cited

U.S. PATENT DOCUMENTS

| 8,800,056 | B2 | 8/2014 | Chow | |
|---|---|---|---|---|
| 2006/0148449 | A1* | 7/2006 | Budde et al. | 455/410 |
| 2007/0236330 | A1 | 10/2007 | Cho et al. | |
| 2013/0102283 | A1 | 4/2013 | Lau et al. | |

* cited by examiner

*Primary Examiner* — Brandon Miller
(74) *Attorney, Agent, or Firm* — BainwoodHuang (57) ABSTRACT

A technique is described that determines if a request for authentication is made on the mobile device belonging to the authorized user by examining non confidential memory parameters of the mobile device, for example a total free memory, or a number of stored phone numbers. The technique examines past authorized user values for the memory parameters and performs a statistical analysis and projects a current memory range for each of the parameters for the authorized user. The projection may include factors such as the amount of time elapsed since the mobile device was acquired, the normal variation over a day, a week, a month or a year, and cyclic variations such as many new applications during a specific month each year. The projection may also include baseline variations which may be provided by analysis of a large number of different people. If the device used for the authorization request has memory parameters different from the projected range of authorized user values, then authorization may be refused.

20 Claims, 4 Drawing Sheets

MOBILE DEVICE INDENTIFICATION BY DEVICE ELEMENT COLLECTION

BACKGROUND

Mobile devices may be used for making remote transactions, for example in purchases of various products or bank balance transfers. Security for mobile transactions is often obtained by a user providing an authorized user name and a password. However, passwords and user names are often stolen in various ways, such as by hackers and phishing expeditions. Stolen login information results in the authorized mobile device user suffering what is known as account takeover, where their mobile device login information is used to steal their money by purchasing objects on their account. Generally, the stolen login information is used on a different mobile device (e.g., the mobile device of the hacker) than the authorized user device.

Conventional schemes for improving security for mobile transactions may use additional levels of information in addition to passwords, for example number generating fobs, individualized account response keys, or knowledge based authentication questions, such as your mother's maiden name, to reduce account takeover. These schemes require a longer login process, increased levels of information memorization, and customer irritation.

It is known to use what are called risk engines to examine features of a remote user's behavior to assess the risk that a preliminary identification (ID) of the user is really the authorized user. Risk engines may examine the hardware ID of the mobile device, the mobile device location, the time of the transaction, or the input device used in the transaction to help reduce the risk that a preliminary ID of a remote user that depends upon the user name and password, is not in fact the authorized user.

SUMMARY

Unfortunately, some deficiencies may exist in the above-described risk-based approach. In particular, user behavior is not a constant and may vary in an unpredictable fashion. For example, a user may make a mobile transaction from an infrequently used location rather than from a normal work location as typically done in the past, or a user may be awake late at night and decide to make a purchase at an atypical time.

Moreover, there are issues with the efficiency and privacy of the conventional schemes to reduce account take over, since they rely on either user provided information, which can be stolen, or they rely on reading the user's mobile device ID, such as chip ID, or the user's mobile carrier subscriber ID, or other unique mobile device ID. Unfortunately, these schemes have lead to personal privacy concerns and data mining concerns, and are being hidden in many new software operating systems.

In contrast to the above-described conventional approaches, improved techniques involve measuring and collecting variable memory parameters from mobile devices and using these measured and collected parameters to identify authenticity of the mobile devices. Such parameters (e.g., total free memory, the number of phone numbers stored in the device, the number of songs in the device, etc.) are easily available and do not possess the privacy/theft concerns that are attached with other risk-based factors such as geo-location, hardware ID, etc. Moreover, trends (e.g., rates of change) can be monitored and thus the values of future memory parameters can be predicted. Accordingly, sharp changes and/or deviations in the rate of change may signal higher risk (i.e., use of a different mobile device) while stable and minor rate changes may indicate lower risk (i.e., use of the same mobile device).

Generally, a commercial establishment receives an authentication request from a mobile device including a set of device memory parameters which are usually changing slowly day by day as the user operates the mobile device. For example, a mobile device user may add new applications, or may add new personal contact information. The mobile device application used to make the authentication request may provide permission for the gathering of specific mobile device information needed by an authentication server. This information is a set of storage aspects of memory of the mobile device which can then be compared to the authorized user's mobile device memory parameters stored on the authentication server to determine if the authentication request is coming from the authorized user's own mobile device. If the user login information is correct and the mobile device memory set up is similar to the authorized user, then the risk of account takeover is reduced since the mobile device itself is seldom stolen, and the chance of a random hacker having the same memory set up as the authorized user is very low. In this case the user request may be authenticated and the user access to a protected resource, such as purchasing an object or service using the authorized user's bank account, may be granted. If the memory set up information is different from that recorded or expected from the authorized user, then increased levels of authentication inquiry may be implemented, or denial of access to the protected resource may occur.

An embodiment is directed towards a method to authenticate a mobile device transaction by establishing a preliminary user ID based upon user provided login information. Then the mobile device making the authentication request is examined to determine values for selected memory parameters having predictable time variation, such as a number of address book entries, a number of stored photographic images, a number of stored MP3 files, a number of installed applications from official markets, a number of installed applications from unofficial markets, a number of installed game applications, a number of installed social applications, a number of installed productivity applications, a number of SMS messages, a number of Email messages, a number of MMS messages, a number of BBM active chats, and an amount of total free memory. A selected set of these or other types of variable memory parameters are then individually and/or jointly analyzed to generate a measured value for the authentication request mobile device. For example, the amount of total free memory may be easily read and directly converted into a specific measured value number. Further, the rate of change of the total free memory tends to change in a steady and predictable fashion and can thus be statistically analyzed and predicted to provide an expected value, or an expected value range, at the time of the preliminary user ID request. The range may be selected to be a standard deviation, or three standard deviations wide depending upon the level of security the protected resource should command.

The expected value range of the selected memory parameter, for example total free memory, is then compared to the measured value from the preliminary user ID request. If the measured value is outside the stored expected authorized user value range, then a choice is made to either refuse authorization, or to increase the level of security questioning.

In another embodiment an adaptive authentication server has an interface, a database and a controller coupled to the interface and the database. The controller is set up to store variable memory parameter values for many authorized user mobile devices in the database over time, and generate a statistical range of expected values taking into account the time depend data trend of each parameter for each user, and of all of the users together in a baseline calculation. The controller will generate a preliminary user ID based on login information from an authorization request. The server will then retrieve the authorized user's mobile device variable memory parameter value range from the memory location indicated by authorization request, and compare it to variable memory parameters from the mobile device. If the measured value from the mobile device requesting authorization is outside the range of expected values then refusing to authorize access, or reassessing the security level either by requesting additional user entered information, or by additional mobile device set up information.

Yet another embodiment is directed towards a computer program product with instructions to establish a preliminary user ID based upon user provided login information, and then to measure the mobile device variable memory parameter values and perform a comparison between the values and a stored authorized users values. This results in an authorization failure if the measured values are outside of the stored range, or alternatively the process can then increase the level of user provided login ID information, or unique mobile device ID factors may be measured and compared.

With such a technique for authorized user mobile device identification the risk of account take over may be reduced without extra time and effort by the user, and without loss of user personal information privacy.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
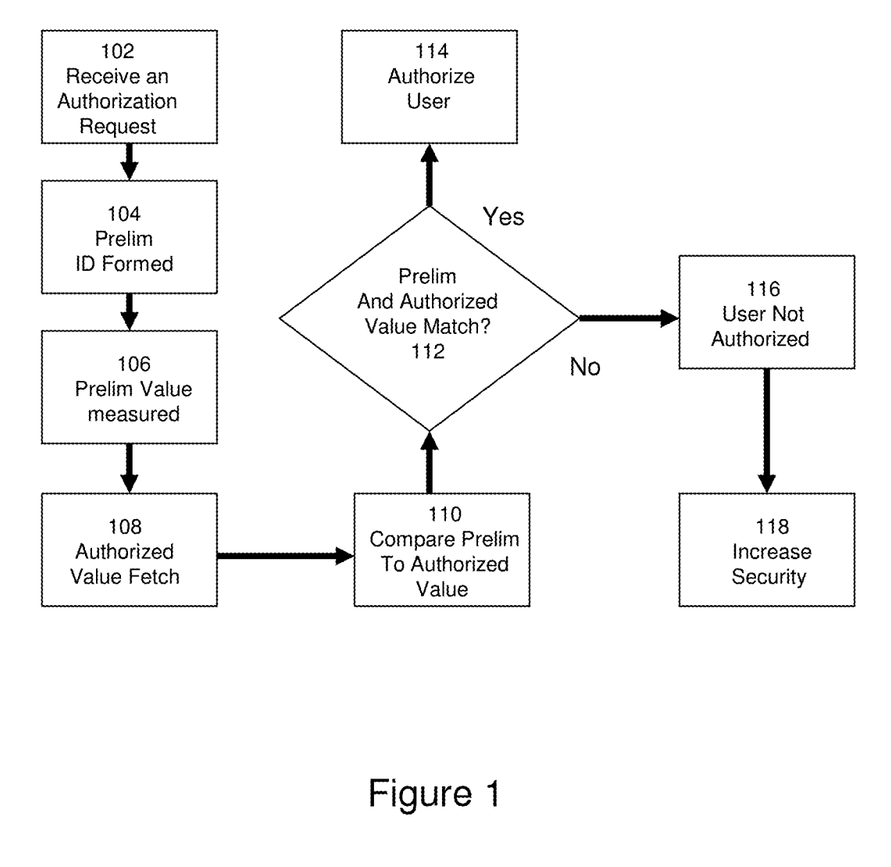
FIG. 1 is a flowchart illustrating an embodiment of the improved technique.

FIG. 1 is a flowchart illustrating an embodiment for authorizing a mobile device request received at step 102. Such authorization requests are used to allow access to protected resources such as a store credit account or a bank account. The system generates preliminary user identification (ID) at 104 with the user name and password supplied by the mobile device, and improves the overall security level by confirming that the mobile device being used belongs to the authorized user. It is unlikely that a person trying to illegally take over an account has the login name and password, as well as the physical mobile device of the authorized user. The improved technique measures the risk that the mobile device requesting authorization is the one used by the authorized user by obtaining information from the mobile device relating to the amount of memory used for a variety of types of information. For example, the number of phone numbers, or the number of applications stored in memory is likely to be different from person to person. If the current amounts of memory used for each of a number of different types of memory storage in the mobile device making the authorization request is similar to a projected statistical range of the authorized user's mobile device in the past, then there is a high probability that the mobile device making the authorization request is that of the authorized user.

The improved system measures a selected number of mobile device memory parameters from the mobile device requesting authorization at step 106. The type of memory parameter selected is of a type that does not provide user personal information, and which is likely to have a predictable rate of change over time, or when comparing one time period to another such as the change during the month versus the change during the same month the previous year. Examples of memory parameters that may be used includes but is not limited to a number of address book entries, a number of stored photographic images, a number of stored MP3 files, a number of installed applications from official markets, a number of installed applications from unofficial markets, a number of installed game applications, a number of installed social applications, a number of installed productivity applications, a number of SMS messages, a number of Email messages, a number of MMS messages, a number of BBM active chats, and an amount of total free memory.

The improved system retrieves authorized user mobile device values from a memory location at step 108, and compares the measured mobile device values to the authorized user mobile device values at step 110. At step 112 a determination is made whether the measured values are within the range of values for the authorized user, and if they are then authorization is granted at step 114. If the measured values for the mobile device requesting authorization are outside the range of values, then authorization is denied at step 116, and an additional step may be taken to increase a level of security inquiry at step 118. For example, the mobile device requesting authorization may be questioned about additional login type questions, such as the name of your favorite pet, or the town where you went to high school, and matched to stored answers previously provided by the authorized user.

With such an arrangement a mobile device authorization request security level may be increased without reducing user convenience, or violating user personal privacy by determining that the authorization request comes from someone who knows the login information as well as having the authorized user's physical mobile device.

Figure 2:
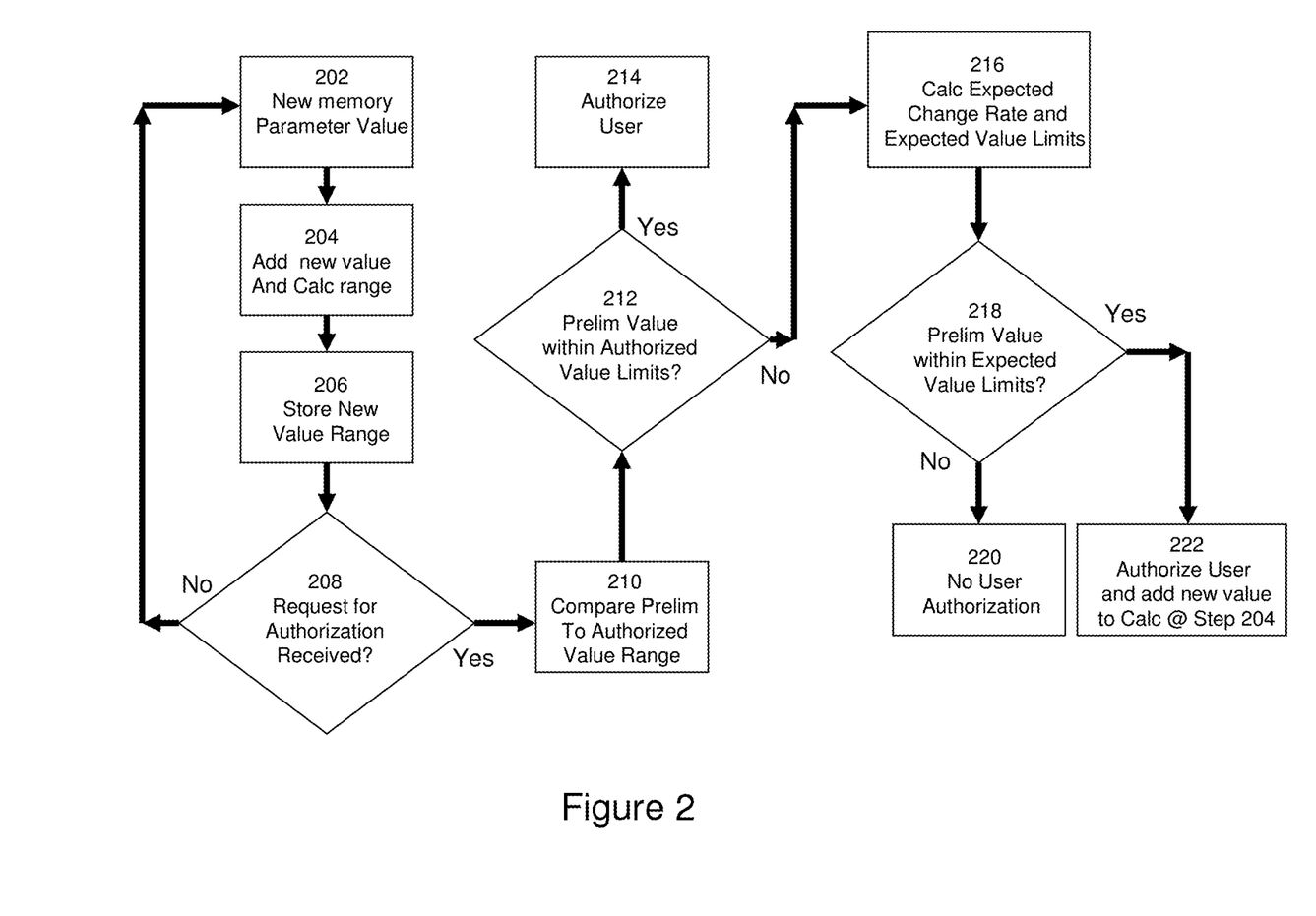
FIG. 2 is a flowchart illustrating another embodiment of the improved technique.

FIG. 2 is a flowchart illustrating another embodiment of the improved technique showing more detail on how the authorized user mobile device parameter ranges are generated and maintained in an up to date level by statistical analysis, and further can provide a new projected new value range from the previous stored values if the preliminary values are close to the range limits, by projecting the probable current values from the time of the last statistical calculation.

The technique will gather new values for the memory parameters at the time of initially setting up a user account, at periodic intervals, and each time the authorized user makes an authorization request at step 202. The new parameter values are added to the existing values and new parameter value ranges are calculated at step 204. The typical type of statistical calculation may include standard deviation, average value, mean value, average rate of change for a selected number of time periods, and a best fit curve.

The new value ranges and limits are then stored in the memory at step 206. At step 208 it is determined if a request for authorization has been received and the process returns to step 202 if there is no new request, or go to step 210 if a request has been received. At step 210 a measurement of the memory parameters of the requesting mobile device is made and the measured values are compared to the most recent stored value ranges. At step 212 a determination is made as to whether the measured values are within the stored value ranges and authorization is provided at step 214 if they match, and are thus probably is the authorized user mobile device.

If the measured values are not all inside the stored ranges at step 212, or if they are very close to the range limit, it is possible that the authorized user mobile device memory parameters may have changed during the time period since the last measurement of the authorized user. The technique moves to step 216 where the stored rate of change is used to project a current set of value ranges a compared to the value ranges at the last measurement of the authorized user mobile device. This use of trend analysis in addition to statistical range calculations discussed previously may prevent an authorized user from suffering inconvenience and time loss simply because a long period of time has elapsed since the last authorization request, or if an unusual event has radically changed one or more of the memory parameter values.

A new determination is made at 218 using the new projected expected value ranges and limits. If the measured values for the mobile device requesting authorization still do not fall within the expected value ranges, then authorization is denied at step 220. If the updated value range does contain the measured values, then authorization is provided at step 222 and the new mobile device values are added into the calculation at step 204.

Such a technique improves the security and efficiency of authorized user access to a protected resource, and increases security over conventional security schemes.

Figure 3:
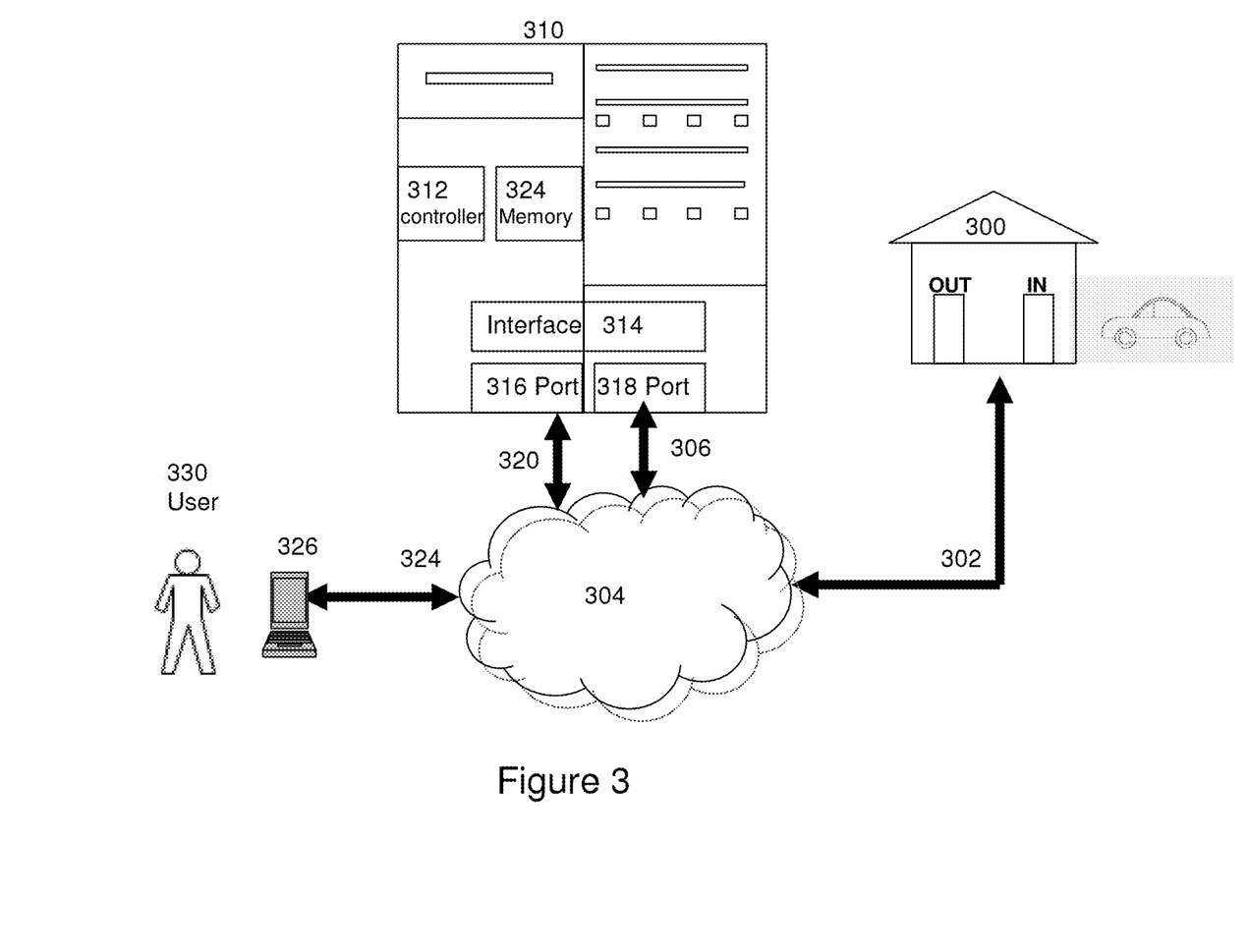
FIG. 3 is a schematic drawing illustrating a system for implementing the improved technique.

FIG. 3 is a schematic drawing illustrating a system for implementing the technique where a store 300 is engaged in online purchase and sale, with access for mobile device activities. The store 300 is connected via a communication method 302 to a communication network 304. The network is shown as a cloud in the figure, but may be any sort of communication, either within the store 300, or the entire world as with the internet or the cloud. The communication method 302 may be a wired connection, or wireless, or LAN, or any other method.

The communication network 304 is connected via communication method 306 to an input port 318 of a computer system 310. Examples of computer system 310 include servers, personal computers, main frame systems, massive parallel microcomputers and other computation devices, and may be located inside the store 300, or located remotely, or located at a third party service company such as a security service. The port 318 may be any sort of communication port such as an input port, or an input/output (I/O) port, wireless or wired with serial or parallel connectors. The computer system 310 will receive the input signal from the store 300 via input port 318 and network interface 314 to controller 312.

The controller 312 is connected to a memory device 324 in which the authorized user's information may be stored, including user name, pass word, mobile device ID numbers, and memory parameters as discussed. The controller 312 is in contact via output port 316 and communication method 320 with the network 304, and occasionally in contact via communication method 324 with mobile device 326 operated by user 330.

The security issues raised during an authorization request by user 330, is whether user 330 knows the correct user name and password, and whether mobile device 326 is the mobile device known to be used by the authorized user.

The authorization request by user 330 using mobile device 326 is transmitted via communication method 324 to network 304 and eventually to the store 300. The authorization request will be transferred to computer system 310, where controller 312 will first examine the first level of security, the user name and password, and then begin the improved technique if the first level security passes. The controller 312 will examine the mobile device 326 and measure selected memory parameters such as total free memory and the number of telephone numbers stored in an address book, and then compare these values with known authorized user mobile device values stored in the memory 324. The controller will calculate a statistical range of values for each of the selected memory parameters based upon a number of past values for each parameter from the authorized user collected over a time period. The statistical calculation will result in a range of possible values and a trend analysis will result in a projection to the current time of the calculated ranges which will be stored in the memory 324.

The controller 312 will compare the measured memory parameter values of mobile device 326 and compare them to the stored calculated value ranges and provide the store 300 with an authorization if the measured values agree with the calculated values, or will send a not authorized signal if the measured values are outside the allowable ranges.

Figure 4:
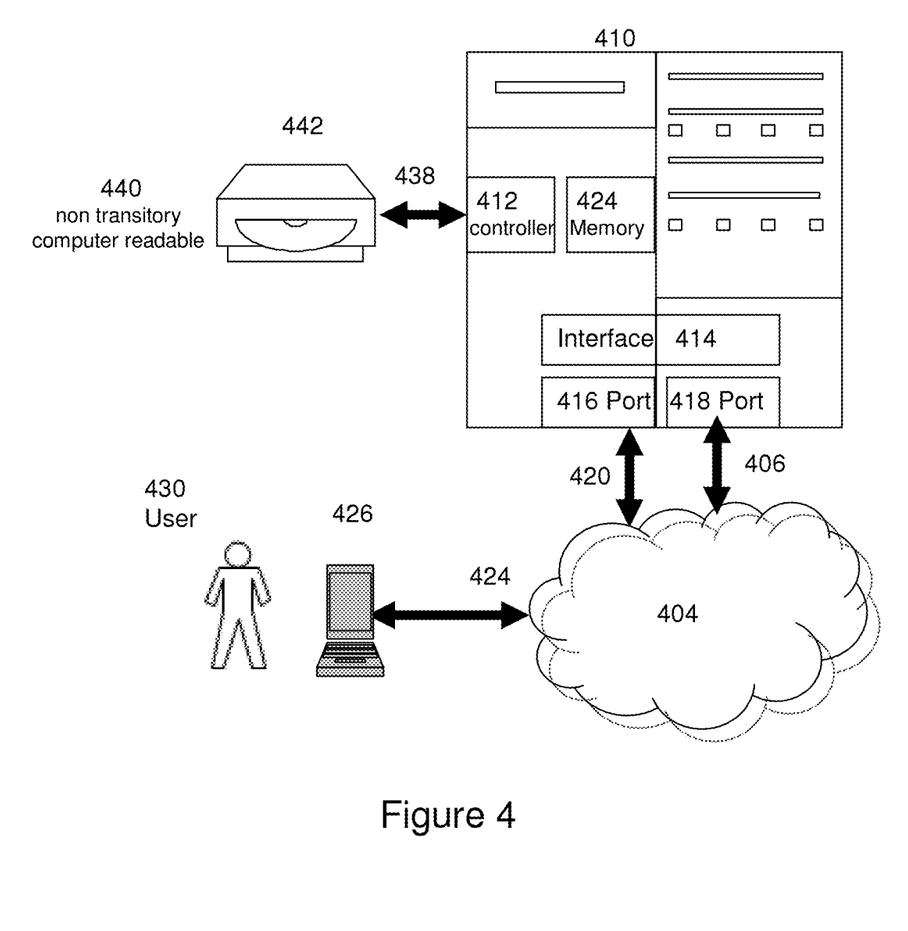
FIG. 4 is a schematic drawing illustrating another system embodiment.

FIG. 4 is a schematic drawing illustrating another system embodiment containing a further technique. The elements in FIG. 4 that are the same as in FIG. 3 have similar numbers and will not be discussed again in this description. If the user 430 authorization request using mobile device 426 results in controller 412 obtaining memory parameter values that do not match those stored in memory 424, then computer system 410 sends a request via output port 420 to user 430 for additional user ID information, such as their mother's maiden name to increase the level of security due to the failure of the memory parameter value match. The user 430 will send the requested increased security question response to the computer system 410 via communication method 424 and the communication network 404 and input port 418 to the controller 412. Controller 412 will compare the enhanced security question answers to the authorized user answers stored in memory 424, and issue an authorization if the answers match, or deny authorization if the answers do not match the stored answers.

Software to control the operation of the computer system 410 is capable of being delivered to the computer system 410 via a computer program product having a non transitory computer readable storage medium 440, shown as being a disk in a disk drive 442 in the figure, but the invention is not so limited and any sort of storage device for storing computer commands may be used. The storage medium stores instructions which, when transmitted via communication method 438 and executed in the controller 412 of computer 410, cause the computer to authenticate a mobile device transaction as previously discussed.

The instruction code and the system may also be used to determine if the mobile device 426 has been stolen by examining the case where the measured values are very close to the limits of the expected value range. If the measured value is within a selected small difference either inside or outside authorized user value range, then further investigation may be undertaken. This may include measuring certain mobile device factors such as the network ID, device ID, user typing speed, the transaction type, the time of day, and the physical location of the mobile device. The general these types of information may be considered an invasion of privacy, but the possibility of theft of the mobile device may permit gathering this data. This data is compared to the stored authorized user mobile device factors, and if network ID and device ID match the stored values and the other device factors do not match the stored values, then the mobile device may be stolen.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method of authenticating a mobile device transaction, the method comprising:
    establishing a preliminary user identification based upon user provided login information;
    measuring preliminary user mobile device variable memory parameters to generate a measured value;
    comparing the measured value to a stored authorized user value range;
    providing a failure to authenticate signal if the comparing indicates the measured value is outside the stored authorized user value range; and
    providing an authenticate signal if the comparing indicates that the measured value is inside the stored authorized user value range.

2. The method of claim 1 wherein comparing the measured value comprises:
    measuring a value of the preliminary user mobile device total free memory and comparing it to a stored authorized user value range of expected total free memory;
    providing an authenticate signal if comparing results in a value inside of the stored authorized user value range;
    providing a failure to authenticate signal if comparing results in a value outside of the stored authorized user value range; and
    calculating a statistical trend in the stored authorized user values over a time period since mobile device acquisition to generate an updated expected value range for the total free memory; and
    repeating the comparing with the updated expected value range used as the authorized user value range.

3. The method of claim 2 wherein calculating the statistical trend further includes an average change value of the authorized user per week, an average change value of the authorized user per month, and a common change rate in a total population of users to form a baseline rate of change.

4. The method of claim 1 wherein measuring the preliminary user mobile device variable memory parameters include a number of address book entries, a number of stored photographic images, a number of stored MP3 files, a number of installed applications from official markets, a number of installed applications from unofficial markets, a number of installed game applications, a number of installed social applications, a number of installed productivity applications, a number of SMS messages, a number of Email messages, a number of MMS messages, a number of BBM active chats, and an amount of total free memory.

5. The method of claim 1 wherein providing a failure to authenticate signal includes increasing a level of authentication inquiry to the user provided login information.

6. The method of claim 1 wherein providing a failure to authenticate signal if the measured value is within a selected difference value outside of the stored authorized user value range further includes:
    measuring preliminary user mobile device factors including at least one of network ID, device ID, typing speed, transaction type, time of day, physical location of the mobile device, and;
    comparing the network ID and device ID against stored authorized user mobile device factors; and
    providing a stolen mobile device signal if network ID and device ID match the stored values and the other device factors do not match the stored values.

7. The method of claim 1 wherein providing an authenticate signal if the measured value is within a selected difference value inside of the stored authorized user value range further includes:
    measuring preliminary user mobile device factors including at least one of network ID, device ID, typing speed, transaction type, time of day, physical location of the mobile device, and;
    comparing the mobile device factors against stored authorized user mobile device factors; and
    providing an increase security alert if the network ID and device ID match the stored values and the other device factors do not match the stored values.

8. The method of claim 1 wherein measuring preliminary user mobile device variable memory parameters to generate a measured value is in response to establishing the preliminary user identification based upon the user provided login information, and
    wherein comparing the measured value to the stored authorized user value range includes verifying whether the measured value is greater than a lower limit of the user value range and less than an upper limit of the user value range.

9. An adaptive authentication server apparatus to authenticate a mobile device transaction, the adaptive authentication server apparatus comprising:
    an interface;
    a database; and
    a controller coupled to the interface and the database, the controller being constructed and arranged to:
        store a plurality of authorized users mobile device variable memory parameter values in a memory location of the database;
        generate a preliminary user identification upon receipt of login information;
        retrieve a stored authorized user mobile device variable memory parameter value range from a user memory location indicated by the preliminary user identification to generate a range of expected values;
        obtain preliminary user variable memory parameters from the mobile device to generate a measured value;
        compare the measured value to the range of expected values;
        transmit an authorization failure signal if the measured value is outside the range of expected values; and
        transmit an authorization signal if the measured value is inside the range of expected values.

10. The adaptive authentication server apparatus of claim 9 wherein preliminary user variable memory parameters include at least one of the following:
    a number of address book entries, a number of stored photographic images, a number of stored MP3 files, a number of installed applications from official markets, a number of installed applications from unofficial markets, a number of installed game applications, a number of installed social applications, a number of installed productivity applications, a number of SMS messages, a number of Email messages, a number of MMS messages, a number of BBM active chats, and an amount of total free memory.

11. The adaptive authentication server apparatus of claim 10 wherein the measured value is generated by measuring a plurality of mobile device variable memory parameters, the controller constructed and arranged to;
- generate a measured value for each mobile device variable memory parameter;
- compare each measured value against a stored authorized user expected value range;
- provide an authenticate signal if each measured value is inside the expected value range; and
- provide a failure to authenticate signal if any measured value is outside the expected value range.

12. The adaptive authentication server apparatus of claim 11 wherein authorized user expected value ranges include a calculated statistical trend in each of the stored authorized user values over at least one of a time period since mobile device acquisition, an average rate of change per month, an average rate of change per week, an average rate of change for the same month in the previous year, and a baseline rate of change in the general population, to generate an expected value range for each of the mobile device variable memory parameters.

13. The adaptive authentication server apparatus of claim 11 further including an increased level of authentication inquiry to the preliminary user provided login information after a failure to authenticate signal is received by the controller.

14. The adaptive authentication server apparatus of claim 11 further including:
- if any of the measured values is within a small selected difference value of the stored authorized user value range limits;
- then compare a set of preliminary user mobile device factors including at least one of typing speed, transaction type, time of day, physical location of the mobile device, and network ID against a set of stored authorized user mobile device factors to generate a difference; and
- generate a stolen mobile device signal if the network ID is the same and the difference is greater than a selected value.

15. A computer program product which includes a non transitory computer readable storage medium storing instructions which, when executed on a computer, cause the computer to authenticate a mobile device transaction, the instructions comprising:
- instructions to establish a preliminary user ID based upon user provided login information;
- instructions to measure preliminary user mobile device variable memory parameter values;
- instructions to perform a comparison between the preliminary user mobile device variable memory parameter values and a stored authorized user's stored mobile device variable memory parameter values; and
- instructions to issue an authorization failure alert if the comparison results in preliminary user mobile device variable memory parameter values that are outside of a selected range of the user's stored mobile device variable memory parameter values, or issue an authorization signal if the comparison values are within the selected range.

16. The computer program product of claim 15 wherein instructions to measure preliminary user mobile device variable memory parameter values include at least one of the following:
- instructions to measure a number of address book entries, a number of stored photographic images, a number of stored MP3 files, a number of installed applications from official markets, a number of installed applications from unofficial markets, a number of installed game applications, a number of installed social applications, a number of installed productivity applications, a number of SMS messages, a number of Email messages, a number of MMS messages, a number of BBM active chats, and an amount of total free memory.

17. The computer program product of claim 15 wherein the measured preliminary user mobile device variable memory parameter values includes;
- instructions to generate a measured value for each mobile device variable memory parameter value;
- instructions to compare each measured value against a stored authorized user expected value range;
- instructions to provide an authenticate signal if each measured value is inside the expected value range; and
- instructions to provide a failure to authenticate signal if any measured value is outside the expected value range.

18. The computer program product of claim 17 wherein stored authorized user's stored mobile device variable memory parameter values includes instructions to calculate a statistical trend in the values over at least one of a time period since mobile device acquisition, an average rate of change per month, an average rate of change per week, an average rate of change for the same month in the previous year, and a baseline rate of change in the general population, to generate an expected value range for each of the mobile device variable memory parameters.

19. The computer program product of claim 17 further including instructions to increase a level of authentication inquiry to the preliminary user provided login information after a failure to authenticate signal is provided.

20. The computer program product of claim 17 further including instructions to generate a stolen mobile device signal if:
- any of the measured values is within a small selected difference value of a range limit of the stored authorized user value;
- measuring preliminary user mobile device factors including at least one of typing speed, transaction type, time of day, physical location of the mobile device, and network ID;
- comparing the measured factors against stored authorized user mobile device factors to generate a difference; and
- if the network ID is the same and the difference is greater than a selected value.

* * * * *

UNITED STATES PATENT AND TRADEMARK OFFICE
CERTIFICATE OF CORRECTION

| | | |
|---|---|---|
| PATENT NO. | : 8,965,340 B1 | Page 1 of 1 |
| APPLICATION NO. | : 13/628441 | |
| DATED | : February 24, 2015 | |
| INVENTOR(S) | : Ayelet Biger-Levin et al. | |

It is certified that error appears in the above-identified patent and that said Letters Patent is hereby corrected as shown below:

On the Title page, item (54) and in the Specification, column 1, line 1, Title:
"indentification", should read --identification--

Signed and Sealed this
Eleventh Day of August, 2015

Michelle K. Lee
*Director of the United States Patent and Trademark Office*